United States Patent
Deshpande et al.

(10) Patent No.: US 9,266,189 B2
(45) Date of Patent: Feb. 23, 2016

(54) STRUCTURE, METHOD OF MAKING A STRUCTURE, AND METHOD OF REDUCING GALVANIC CORROSION

(71) Applicant: GM Global Technology Operations LLC, Detroit, MI (US)

(72) Inventors: Kiran Deshpande, Hosakote Bangalore (IN); Kaustubh Narhar Kulkarni, Kundalahalli Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 13/739,200

(22) Filed: Jan. 11, 2013

(65) Prior Publication Data

US 2014/0199114 A1   Jul. 17, 2014

(51) Int. Cl.
| | |
|---|---|
| *B25G 3/34* | (2006.01) |
| *F16B 11/00* | (2006.01) |
| *F16B 12/04* | (2006.01) |
| *F16L 13/00* | (2006.01) |
| *B23K 20/02* | (2006.01) |
| *B23K 37/04* | (2006.01) |
| *B23K 20/04* | (2006.01) |

(52) U.S. Cl.
CPC ............... *B23K 20/02* (2013.01); *B23K 20/04* (2013.01); *B23K 37/0443* (2013.01); *B23K 2201/006* (2013.01); *B23K 2203/20* (2013.01); *Y10T 403/477* (2015.01); *Y10T 403/478* (2015.01)

(58) Field of Classification Search
CPC ............ Y10T 403/477; Y10T 403/478; B23K 2201/006; B23K 2203/20; B23K 37/0443; B23K 20/0204

USPC ............... 403/270, 271, 408.1; 428/641–648, 428/649, 650–654, 674–677, 658–659, 428/681–685
See application file for complete search history.

(56) References Cited

U.S. PATENT DOCUMENTS

| | | | | |
|---|---|---|---|---|
| 3,099,083 | A | * | 7/1963 | De Long .......................... 29/458 |
| 3,756,836 | A | * | 9/1973 | Weber et al. ................ 106/14.44 |
| 5,454,628 | A | | 10/1995 | Maiworm et al. |
| 6,045,196 | A | * | 4/2000 | Mason ..................... 301/63.104 |

(Continued)

OTHER PUBLICATIONS

Mahendran, G., et al., "Developing diffusion bonding windows for joining AZ31B magnesium—AA2024 aluminium alloys", Materials and Design 30, 2009, pp. 1240-1244.

(Continued)

*Primary Examiner* — Greg Binda
*Assistant Examiner* — Nahid Amiri
(74) *Attorney, Agent, or Firm* — Dierker & Associates, P.C.

(57) ABSTRACT

An example of a structure includes a first component including a first material, and a second component joined to the first component. The second component includes a second material that is dissimilar from the first material. A spacer is disposed between the first and second components, and the spacer eliminates galvanic corrosion of the first component at an interface between the first component and the second component. The spacer includes a first layer consisting of the first material, a second layer bonded to the first layer and consisting of a third material, and a third layer bonded to the second layer and consisting of the second material. The third material of the second layer is different from the first material and different from the second material. Other examples are directed to a method of making the structure, and a method for reducing galvanic corrosion.

12 Claims, 7 Drawing Sheets

(56) References Cited

U.S. PATENT DOCUMENTS

| | | | |
|---|---|---|---|
| 6,715,843 B2 * | 4/2004 | Teague | 301/35.621 |
| 7,845,388 B2 | 12/2010 | Luo et al. | |
| 8,088,497 B2 * | 1/2012 | Hu et al. | 428/626 |
| 8,092,923 B2 | 1/2012 | Thamida | |
| 2009/0208773 A1 | 8/2009 | DuPont | |
| 2010/0143746 A1 | 6/2010 | Song et al. | |
| 2010/0310899 A1 * | 12/2010 | Hu et al. | 428/649 |
| 2011/0052935 A1 * | 3/2011 | Nakagawa et al. | 428/649 |
| 2011/0097595 A1 | 4/2011 | Takeda et al. | |
| 2012/0155988 A1 * | 6/2012 | Schumacher et al. | 411/369 |

OTHER PUBLICATIONS

Jindal, Vikas, et. al., "Growth of intermetallic layer at roll bonded IF-steel/aluminum interface", Journal of Materials Processing Technology 195, 2008, pp. 88-93.

* cited by examiner

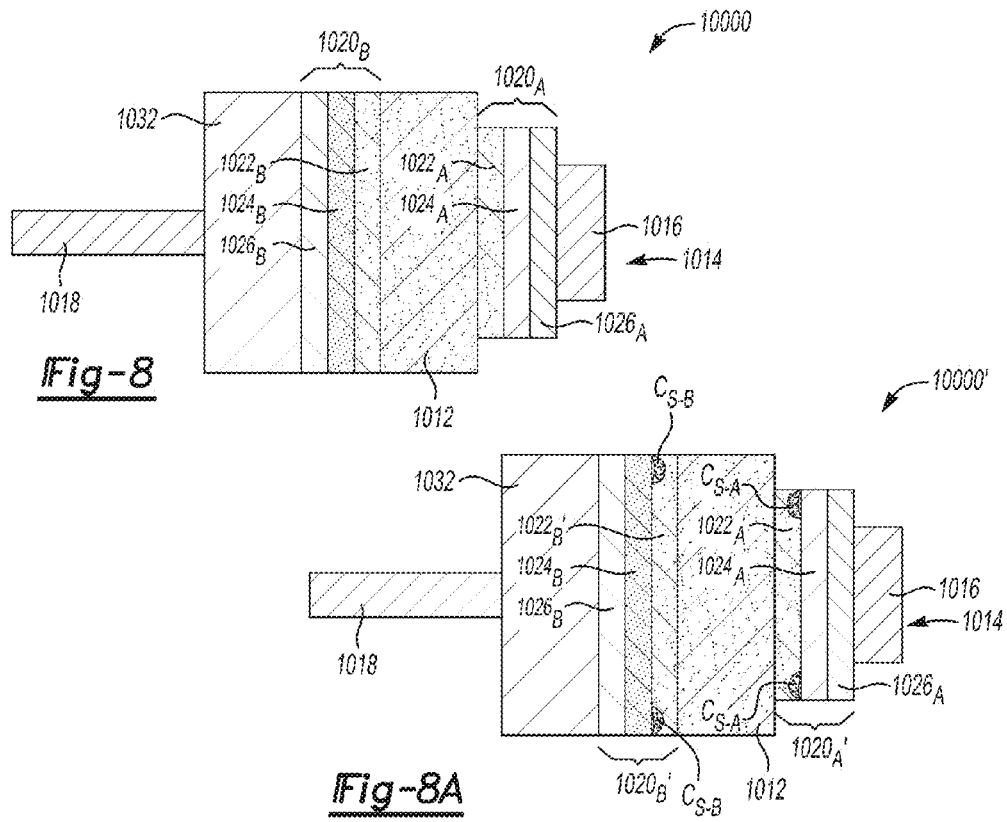
*Fig-8*
*Fig-8A*
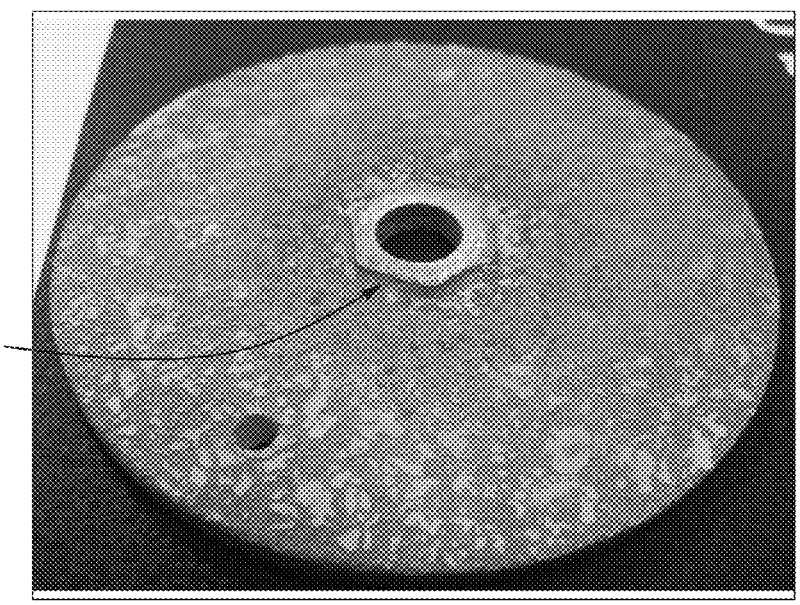
*Fig-9A*

US 9,266,189 B2

STRUCTURE, METHOD OF MAKING A STRUCTURE, AND METHOD OF REDUCING GALVANIC CORROSION

TECHNICAL FIELD

The present disclosure relates generally to structures, methods of making a structure, and methods of reducing galvanic corrosion.

BACKGROUND

Magnesium and magnesium alloys may be used for forming structural parts in automotive and/or aerospace industries. A magnesium or magnesium alloy component may be joined to, or may otherwise be placed into contact with another component that is formed from, or includes a dissimilar material (such as, e.g., steel, aluminum, titanium, etc.). In some instances (for example, when the components are exposed to a corrosive environment), galvanic corrosion of the magnesium or magnesium alloy may occur at an interface formed between the magnesium or magnesium alloy component and the other component.

SUMMARY

Examples of a structure are disclosed herein. In one example, the structure includes a first component, a second component that is joined to the first component, and a spacer disposed between the first component and the second component. The first component includes a first material, and the second component includes a second material that is dissimilar from the first material. The spacer disposed between the first and second components eliminates galvanic corrosion of the first component at an interface between the first component and the second component. The spacer includes a first layer consisting of the first material, a second layer bonded to the first layer, and a third layer (consisting of the second material) bonded to the second layer. The second layer consists of a third material that is different from the first material and that is different from the second material.

Also disclosed herein are example(s) of a method of making examples of the structure, and example(s) of a method of reducing galvanic corrosion.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 5A-1 is a concentration profile of magnesium and aluminum of the portion of the multilayered spacer shown in the SEM image in FIG. 5A;

FIG. 8 schematically depicts a structure according to another example of the present disclosure, where the structure includes i) a magnesium component, a steel fastener, and an example of a multilayered spacer disposed between the magnesium component and a head portion of the fastener, and ii) the magnesium component, an aluminum component, and another example of a multilayered spacer disposed between the two components;

FIG. 8A schematically depicts the example of the structure depicted in FIG. 8 after the structure has been exposed to a corrosive environment;

FIGS. 9A, 9B, and 9C are photographs of a top view of three different structures after being exposed to a corrosive environment, where i) the comparative structure of FIG. 9A includes a magnesium component and a steel fastener, and does not include a spacer, ii) the comparative structure of FIG. 9B includes a magnesium component, a steel fastener, and an aluminum spacer disposed between the magnesium component and a head portion of the steel fastener, and iii) the structure of FIG. 9C includes a magnesium component, a steel fastener, and an example of the multilayered spacer disclosed herein disposed between the magnesium component and a head portion of the steel fastener.

DETAILED DESCRIPTION

Figure 1:
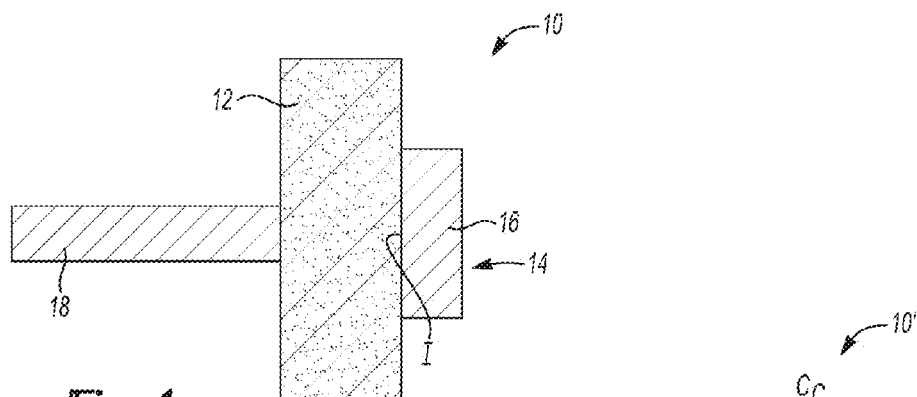
FIG. 1 schematically depicts an example of a prior art structure including two components that are in contact with one another, where one of the components is a magnesium component and the other component is a steel fastener.

Some structures are made by joining together two components that are individually formed from, or include dissimilar materials. As used herein, the term "material" refers to the composition of one or more elements that make up a component. A material may consist of a single element (e.g., magnesium) or a combination of elements (e.g., magnesium and aluminum). In instances where the material is a combination of metal elements, the material is said to be an alloy. Further, the composition of a material including a combination of elements includes the amount of each element. For instance, for a magnesium-aluminum alloy, the material includes magnesium that is present in a particular amount and aluminum that is present in a particular amount. Accordingly, a component that is formed from, or includes a material that is dissimilar from that of another component means that the component is not formed from, or does not include the same material as the other component. For example, if one of the components in a structure is formed from, or includes pure magnesium, then the other component in the structure is formed from, or includes any material other than pure magnesium alone. The material of the other component may be another element (e.g., pure aluminum), an alloy including other elements (e.g., an aluminum-titanium alloy), or an alloy including the material of the component (e.g., an aluminum-magnesium alloy, a magnesium-titanium alloy, etc.). In another example, if one of the components in a structure is formed from, or includes a magnesium-aluminum alloy containing 95 wt % magnesium and 5 wt % aluminum, then the other component in the structure is formed from, or includes any material other than the same magnesium-aluminum alloy. For instance, the material of the other component may be another magnesium alloy (e.g., a magnesium-titanium alloy, a magnesium-aluminum-iron alloy, or the like), an element (e.g., magnesium), or another magnesium-aluminum alloy having a different composition (e.g., a magnesium-aluminum alloy having, for instance, about 80 wt % magnesium and 20 wt % aluminum).

When two components are joined together (i.e., attached to one another), the components may be physically in contact with one another. Two components that are joined together may also not be physically in contact with one another due to some intervening part. Generally, when two components are "in contact with" one another, it is meant that the two components are situated so that at least one surface of one of components physically touches at least one surface of the other component. An interface may form between the two components when the two components are in contact with one another. It is to be understood that two components do not necessarily have to be joined together in order for the two components to be in contact with one another. For instance, two panels may be positioned so that the panels touch each other, but are not actually joined (e.g., attached) to one another.

One of the components may, in some instances, be susceptible to galvanic corrosion at an interface formed between the component and another component when exposed to a corrosive environment. Briefly, galvanic corrosion may be described as an electrochemical process where one of the components (e.g., a magnesium component) corrodes more favorably relative to the other component (e.g., a steel component) when the two components come into contact with one another (e.g., when the two components are joined together to form a structure). By their different electric potentials, the two components form the anode and the cathode of a galvanic cell when exposed to a corrosive environment. The electrolyte solution of the galvanic cell is the corrosive environment that the components are exposed to. Some examples of corrosive environments include a humid environment (e.g., an environment with a relative humidity higher than 75%), an environment containing water, an environment containing salt, an environment containing alcohol vapors and/or other chemicals (such as, e.g., in cooling systems, fuel systems, deicing systems, cleaning solutions, etc.), and/or the like. The corrosive environment basically provides a medium for the passage of metallic ions from the anode (e.g., the magnesium component) to the cathode (e.g., the steel component), which causes the magnesium component (i.e., the anode) to corrode.

It is to be understood that general corrosion, in addition to galvanic corrosion, of a component (e.g., a magnesium component) may also occur. For instance, magnesium is a binary phase component. When exposed to a corrosive environment, general corrosion may occur between the two phases of the magnesium, and thus may occur within the magnesium component. In instances where galvanic corrosion has been eliminated, it is to be understood that general corrosion may still occur.

Examples of the structure, as disclosed herein, include a multilayered spacer disposed at the interface between two components of dissimilar materials that are joined together. The inventors of the present disclosure have found that the presence of the multilayered spacer in the examples of the structure actually eliminate galvanic corrosion of the components. Rather, galvanic corrosion occurs, if at all, at one or more of the layers of the multilayered spacer. In effect, galvanic corrosion of the structure as a whole is significantly reduced, and this will improve the structural integrity of the structure and will prolong its useful life.

Examples of prior art structures described below in conjunction with FIGS. 1, 1A, 2, and 2A, and examples of the structure of the present disclosure described below in conjunction with FIGS. 3, 3A, 4, 5A, and 5B include one component that is formed from, or includes magnesium or a magnesium alloy, and another component that is formed from, or includes steel (e.g., mild steel, wrought steel, and the like). The example of the structure described below in conjunction with FIGS. 8 and 8A includes one component that is formed from, or includes magnesium or a magnesium alloy, another component that is formed from, or includes aluminum or an aluminum alloy, and yet another component that is formed from, or includes steel. It is to be understood that structures containing other combinations of components may also be used. For example, a structure may include one component formed from, or including magnesium or a magnesium alloy and another component formed from, or including titanium or a titanium alloy. In another example, a structure may include one component formed from, or including magnesium or a magnesium alloy and another component formed from, or including aluminum or an aluminum alloy.

Further, the examples of the structure disclosed herein utilize magnesium or a magnesium alloy as one of the components. Magnesium and magnesium alloys are used in the automotive industry, and some examples of components that may be made from, or may include magnesium or magnesium alloys include engine cradles, wheels, transfer cases, door and other body panels or structures, engine blocks, and many under-the-hood automotive components. Other industries that may utilize magnesium (which includes pure magnesium and magnesium alloys) include aerospace industries, construction (e.g., buildings, homes, etc.), tools (e.g., electrical tool boxes, etc.), various household or other building components (e.g., hand-held operating tools, various electronic equipment, etc.), marine equipment (e.g., inboard and/or outboard motors, etc.), sports equipment (e.g., golf clubs, etc.) and/or the like.

While magnesium or magnesium alloys are described herein as being one of the components of the examples of the structure, it is to be understood that present disclosure may also be practiced for structures that i) do not include magnesium or a magnesium alloy as one of the components, and ii) include at least two components formed from, or including dissimilar materials. An example of such a structure includes one that includes an aluminum component and a steel component.

Further, in the examples disclosed herein, magnesium, aluminum, titanium, etc. may be present in its pure form, which may contain impurities constituting 1% or less of the total composition of the material. Magnesium, aluminum, titanium, or the like may also be present in the form of an alloy, where the magnesium, aluminum, titanium, or the like is the primary, main, or prominent element in the alloy. In an example, the alloy contains at least 80% of the magnesium, aluminum, titanium, or the like. In another example, the alloy contains at least 90% of the magnesium, aluminum, titanium, or the like. It is to be understood that magnesium, aluminum, titanium, or the like may be part of another alloy as an alloying element. For instance, an aluminum alloy may contain a small amount of magnesium. In this instance, the magnesium is a secondary element, and thus the alloy would not be considered to be a magnesium alloy even though the alloy contains a small amount of magnesium.

An example of a prior art structure is schematically depicted in FIG. 1. This structure 10 includes a component 12 that is in contact with another component 14, where the two components 12, 14 are formed from, or include dissimilar materials.

In an example, the component 12 is an engine cradle for an automobile that is formed from or includes magnesium as its main, primary, or prominent element. The component 14 is a fastener for joining the magnesium component 12 to still another component (not shown). The fastener 14 is formed from, or includes a material that is dissimilar from that of the magnesium component 12. In this example, the fastener 14 is formed from, or includes steel which has iron as its main, primary, or prominent element. In an example, the steel includes at least 70% iron content. As shown in FIG. 1, the fastener 14 includes a head portion 16 that abuts a surface of the magnesium component 12, and a fastening portion 18 that is disposed through the magnesium component 12. An interface I is formed between the magnesium component 12 and the head portion 16 of the fastener 14.

Figure 1A:
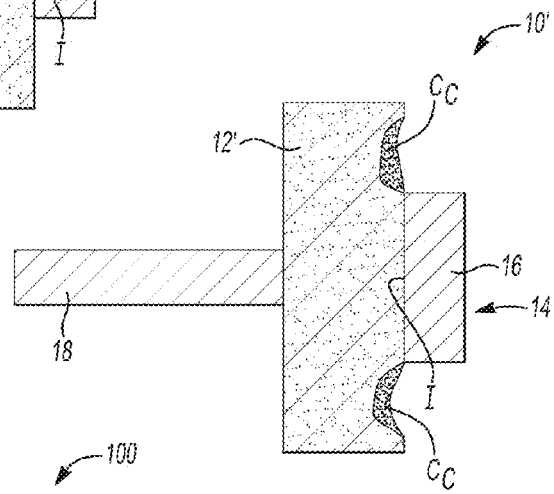
FIG. 1A schematically depicts the example of the prior art structure of FIG. 1 after the prior art structure has been exposed to a corrosive environment.

After being exposed to a corrosive environment, galvanic interaction may occur at the interface I formed between the magnesium component 12 and the steel fastener 14 of the structure 10. The galvanic corrosion may cause portion(s) of the magnesium component 12 (which acts as the anode of a galvanic cell) to corrode. Galvanic corrosion of the magnesium component 12 generally starts at the interface I, and will spread laterally and/or medially from the interface I over time (e.g., after constant or repeated exposure to the same or a different corrosive environment). As shown in FIG. 1A, the resultant structure 10' includes the magnesium component 12' having portions thereof corroded away as depicted by reference character $C_C$. It has been found that the magnesium component 12' having the corroded portions $C_C$ will have less strength and a reduced useful life compared to the magnesium component 12 prior to galvanic corrosion.

Figure 2:
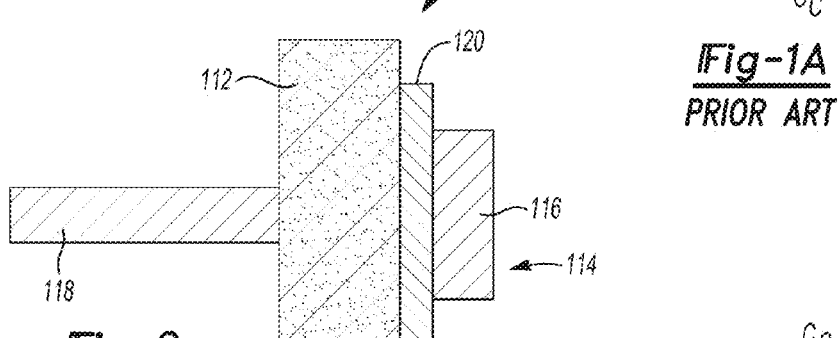
FIG. 2 schematically depicts an example of another prior art structure including a magnesium component, a steel fastener, and an aluminum spacer disposed between the magnesium part and a head portion of the steel fastener.
Figure 2A:
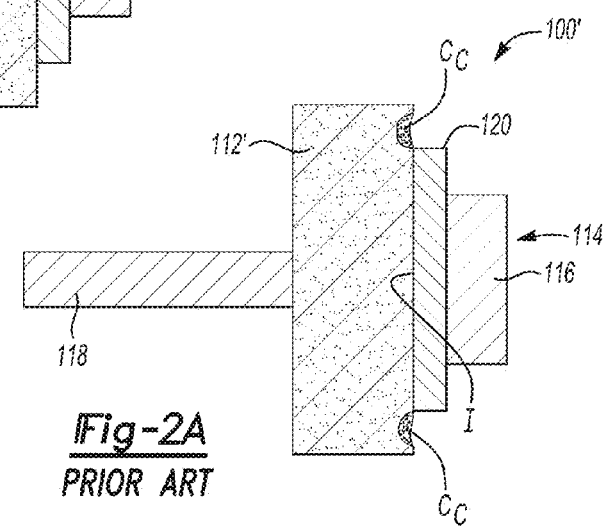
FIG. 2A schematically depicts the example of the other prior art structure of FIG. 2 after the other prior art structure has been exposed to a corrosive environment.

Studies have shown that the galvanic corrosion occurring at the interface I between the magnesium component 12 and the steel component 14 may be reduced by introducing an aluminum spacer between the two components 12, 14. An example of such a structure 100 is shown in FIG. 2, where the structure 100 includes a magnesium component 112, a steel fastener 114 including a head portion 116 and a fastening portion 118, and an aluminum spacer 120 disposed between the magnesium component 112 and the head portion 116 of the steel fastener 114. The aluminum spacer 120 is formed from, or includes pure aluminum or an alloy having aluminum as its main, primary, or prominent element. After the structure 100 had been exposed to a corrosive environment, it was found that galvanic corrosion of the magnesium component 112 was reduced compared to the structure 10 without the aluminum spacer 120. As such, galvanic corrosion reduction has been attributed to the addition of the aluminum spacer 120. For instance, as shown in FIG. 2A, the corroded portions $C_C$ of the magnesium component 112' for the structure 100' is visibly smaller than the corroded portions $C_C$ of the magnesium component 12' for the structure 10' shown in FIG. 1A. It is believed that galvanic corrosion of the magnesium component 112' is reduced because the potential difference between aluminum and magnesium is smaller than the potential difference between magnesium and steel.

Figure 3:
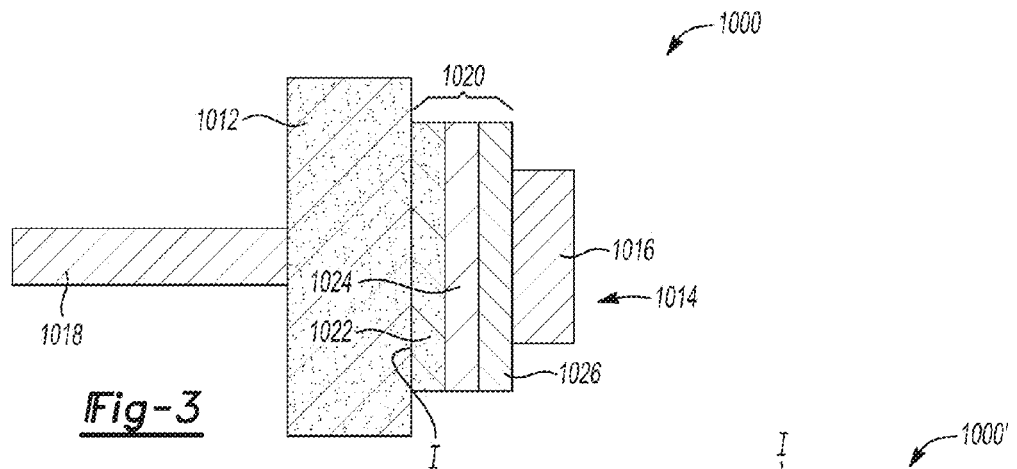
FIG. 3 schematically depicts a structure according to an example of the present disclosure, where the structure includes a magnesium component, a steel fastener, and a multilayered spacer disposed between the magnesium component and a head portion of the steel fastener.

As previously mentioned, the inventors of the present disclosure have found that galvanic corrosion of the magnesium component can be eliminated, and thus galvanic corrosion of the whole structure may be further reduced, by introducing a multilayered spacer between the two components formed from, or including the dissimilar materials. An example of such a structure 1000 is shown in FIG. 3, where the structure 1000 includes a magnesium component 1012, a steel fastener 1014 including a head portion 1016 and a fastening portion 1018, and the multilayered spacer 1020 disposed between the magnesium component 1012 and the head portion 1016 of the steel fastener 1014. The multilayered spacer 1020 includes a first layer 1022, a second layer 1024, and a third layer 1026.

The first layer 1022 of the spacer 1020 consists of the same material as the magnesium component 1012. As used herein, the phrase "consists of" means that the first layer 1022, for example, includes the same material as the magnesium component 1012 and no additional materials. For instance, if the magnesium component 1012 is formed from magnesium alloy AM50, then the first layer 1022 of the spacer 1020 is also formed from magnesium alloy AM50 and does not include any other material(s).

The third layer 1026 of the spacer 1020 consists of the same material as the other component of the structure 1000, e.g., the steel fastener 1014 in the example depicted in FIG. 3. For instance, if the steel fastener 1014 is formed from mild steel (which includes 0.05 wt % carbon, 0.2 wt % manganese, 0.05 wt % silicon, 0.02 wt % sulfur, 0.01 wt % phosphorus, and a balance of iron), then the third layer 1026 is also formed from mild steel and does not include any other material(s).

The second layer 1024 of the spacer 1020, which is disposed between the first 1022 and third 1026 layers, consists of a material that is different from the material of the first layer 1022 and that is different from the material of the third layer 1026. The selection of the material for the second layer 1024 depends, at least in part, on the composition of the magnesium component 1012 and the other component 1014 of the structure 1000. For instance, the material for the second layer 1024 may be selected from aluminum, an aluminum alloy, zinc, or a zinc alloy when the component 1012 is magnesium or a magnesium alloy and the other component (e.g., 1014) is steel. Other examples of the material for the second layer 1024 include i) zinc or zinc alloys for a structure including a magnesium component and an aluminum component (e.g., pure aluminum (which may include less than 1% impurities), or an aluminum alloy which contains at least 90% aluminum content (e.g., AA6063)), or ii) aluminum, iron, copper, tin, and alloys thereof for a structure including a magnesium component and a titanium component.

As shown in FIG. 3, the spacer 1020 is situated so that the first layer 1022 (which consists of the same material as the component 1012) abuts the magnesium component 1012 and the third layer (which consists of the same material as the fastener 1014) abuts the head portion 1016 of the steel fastener 1014.

The first layer 1022 is diffusion bonded to the second layer 1024, and the second layer 1024 is diffusion bonded to the third layer 1026. Examples of diffusion bonding of the layers 1022, 1024, 1026 will now be described herein. In one example, the first 1022, second 1024, and third 1026 layers are magnesium, aluminum, and steel discs, respectively, and these discs are commercially available. The discs 1022, 1024, 1026 are arranged and assembled in the desired order (e.g., first layer 1022, second layer 1024, and then third layer 1026) and the assembly is clamped together in a stainless steel jig. In an example, diffusion bonding of the first disc 1022 to the second disc 1024, and diffusion bonding of the second disc 1024 to the third disc 1026 are accomplished at the same time. The assembly is heated in an air circulated oven at a processing temperature for an amount of time sufficient for interdiffusion to occur across an interface defined between the first layer (or disc) 1022 and the second layer (or disc) 1024, and for interdiffusion to occur across an interface defined between the second layer (or disc) 1024 and the third layer (or disc) 1026. In an example, the assembly is heated to about 390° C. for about 2 days. Further, since the assembly is clamped together in a stainless steel jig, the pressure of the assembly is higher than atmospheric pressure. It is to be understood that the applied pressure and temperature may change the time for performing diffusion bonding.

Figure 6:
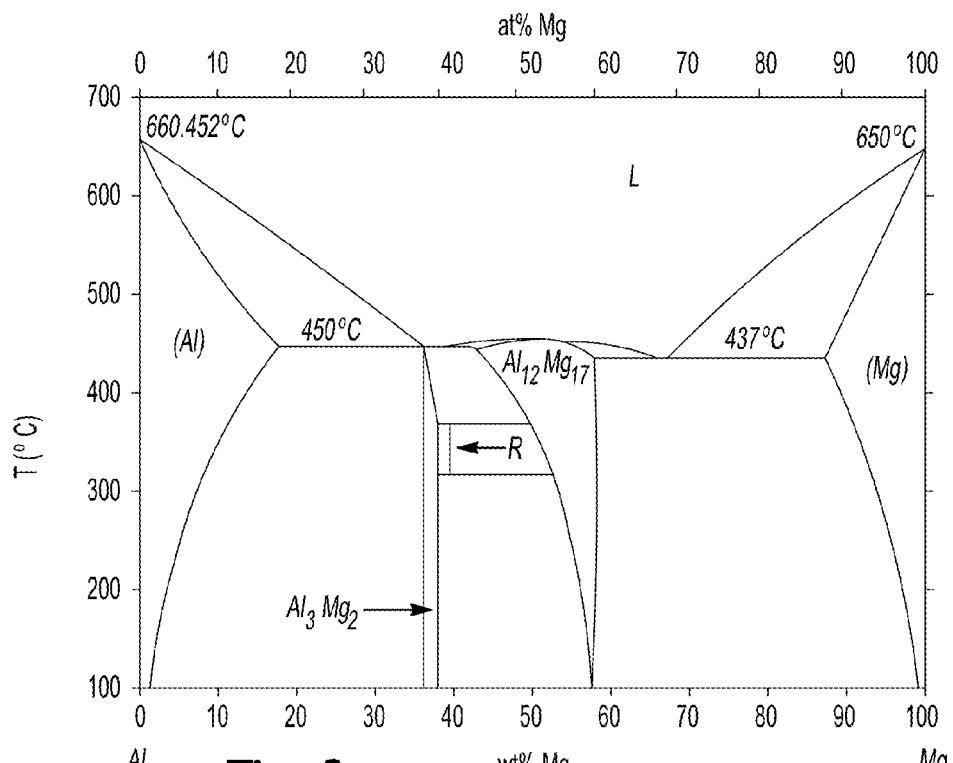
FIG. 6 is a phase diagram of an aluminum-magnesium alloy obtained from Volume 3 of the ASM Handbook.
Figure 7:
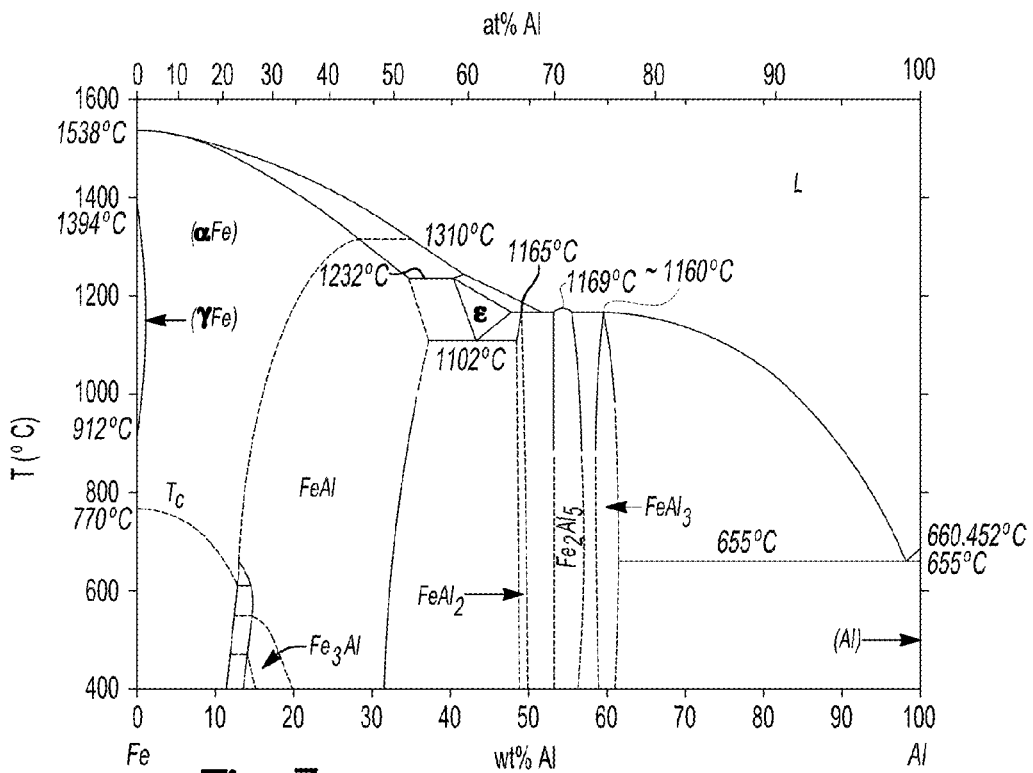
FIG. 7 is a phase diagram of an aluminum-iron alloy obtained from Volume 3 of the ASM Handbook.

As discussed above, when diffusion bonding of the first 1022 and second 1024 layers of the spacer 1020 is accomplished at the same time as diffusion bonding of the second 1024 and third 1026 layers, the same operating parameters will be used to accomplish the diffusion bonding. It is to be understood, however, that different operating parameters may be necessary for effective diffusion bonding of the first 1022 and second 1024 layers and for effective diffusion bonding of the second 1024 and third 1026 layers. This may be due, at least in part, to the different combination of materials to be bonded. For instance, the temperature at which the layers are heated to achieve desired diffusion bonding may be determined from the respective phase diagrams of an alloy formed by the components of the different layers to be bonded. This "alloy" would contain about 50 wt % of one of the layers and about 50 wt % of the other layer. For instance, as shown in the phase diagram for an aluminum-magnesium alloy in FIG. 6, the formation of an $Al_{12}Mg_{17}$ interlayer portion may be accomplished at a diffusion bonding temperature ranging from about 380° C. to less than 437° C. so that the magnesium component does not melt. A much higher processing temperature may be required, however, for diffusion bonding the aluminum layer to a steel layer. As shown in the phase diagram for an aluminum-iron alloy in FIG. 7, the formation of $Fe_2Al_5$ occurs at a processing temperature (T) ranging from 400° C. to less than 655° C. so that the aluminum component does not melt.

As such, in another example, diffusion bonding of the first layer (or disc) 1022 and the second layer (or disc) 1024, and diffusion bonding of the second layer (or disc) 1024 and the third layer (or disc) 1026 are accomplished in separate steps. Since the eutectic melting temperature of aluminum is higher than that of magnesium, diffusion bonding of the second and third layers (or discs) 1024, 1026 is accomplished first, and then diffusion bonding of the first and second layers (or discs) 1022, 1024 is accomplished second. For instance, the second and third discs 1024, 1026 are assembled, clamped together in a stainless steel jig, and then heated to a temperature (T) that is less than the eutectic melting temperature of aluminum (e.g., less than 655° C. based on the phase diagram depicted in FIG. 7). Then, the first disc 1022 and the assembly including the second and third discs 1024, 1026 are assembled (e.g., where the first disc 1022 is positioned adjacent to the second disc 1024), clamped together in the stainless steel jig, and then heated to a temperature (T) that is less than the eutectic melting temperature of magnesium (e.g., less than 437° C. based on the phase diagram depicted in FIG. 6).

It has been found that less time is required for diffusion bonding of the layers 1022, 1024, 1026 in two steps compared to diffusion bonding of the layers 1022, 1024, 1026 in a single step. This may be due, at least in part, to the fact that temperature and pressure may be optimized for the two materials in each step of the two-step process. When simultaneously diffusion bonding two different material sets (e.g., Fe—Al and Al—Mg), a common temperature and pressure (which may not be optimal for one or more of the materials) is utilized for all three materials, which can lead to longer processing times in order to achieve the desirable results. In an example, diffusion bonding is accomplished after about 2.5 hours of heating in each of the steps of a two-step diffusion bonding process. In contrast, diffusion bonding of the layers 1022, 1024, 1026 in a single step requires a much longer processing time, e.g., about 2 days. Thus, optimization of diffusion bonding of the layers 1022, 1024, 1026 in separate steps may be desirable. In an example, optimization of diffusion bonding of a magnesium layer and an aluminum layer may be accomplished as described in Mahendran, et al., *Developing diffusion bonding windows for joining AZ*31*b magnesium-AA*2024 *aluminum alloys*, Materials and Design 30 (2009) 1240-1244. Further, optimization of diffusion bonding of an aluminum layer and a steel layer may be accomplished as described in Jindal, et al., *Growth of intermetallic layer at roll bonded IF-steel/aluminum interface*, Journal of Materials Processing Technology, 195 (2008) 88-93. Each of these references is herein incorporated by reference in its entirety.

Yet another example of diffusion bonding involves diffusion bonding of a magnesium sheet, an aluminum sheet, and a steel sheet arranged in the desired order. Diffusion bonding may be accomplished in a single step (e.g., all three sheets together), or by diffusion bonding in two steps (e.g., bonding of the aluminum sheet and the steel sheet first, and then bonding of the magnesium sheet to the assembly of the aluminum sheet and the steel sheet second). The diffusion bonding process may then be accomplished in the same manner as previously described for the diffusion bonding of the first 1022, second 1024, and third 1026 discs. When diffusion bonding sheets together, the previously described jig may be not suitable, and thus the diffusion bonding may be accomplished using a hot press at a desired temperature and pressure. In another example, sheets 1022, 1024 and/or 1024, 1026 may be diffusion bonded using a continuous hot rolling process (where the sheets 1022, 1024 and/or 1024, 1026 are sandwiched together). After diffusion bonding (either via single step bonding or two step bonding), the bonded sheets are stamped or otherwise cut into discs of desired size to form the multilayered spacer 1020 including the magnesium layer 1022, the aluminum layer 1024, and the steel layer 1026.

Figure 4:
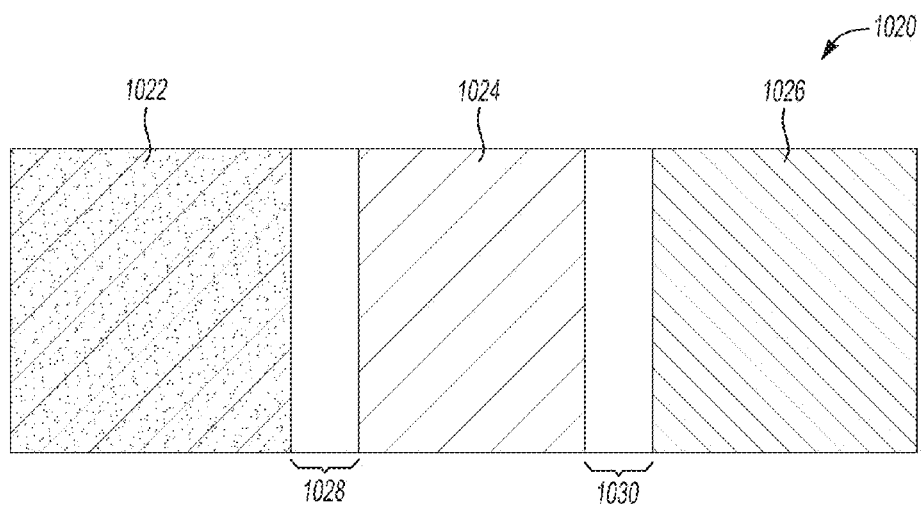
FIG. 4 schematically depicts an enlarged view of an example of the multilayered spacer for the example of the structure depicted in FIGS. 3 and 3A, where the multilayered spacer includes a magnesium layer, an aluminum layer, a steel layer, and an interlayer between i) the magnesium layer and the aluminum layer and ii) the aluminum layer and the steel layer.

Referring now to FIG. 4, during diffusion bonding, an interlayer 1028 forms between the first layer 1022 and the second layer 1024, and an interlayer 1030 forms between the second layer 1024 and the third layer 1026. The interlayer 1028 effectively isolates the first layer 1022 from the second layer 1024, and the interlayer 1030 effective isolates the second layer 1024 from the third layer 1026.

Figure 5A:
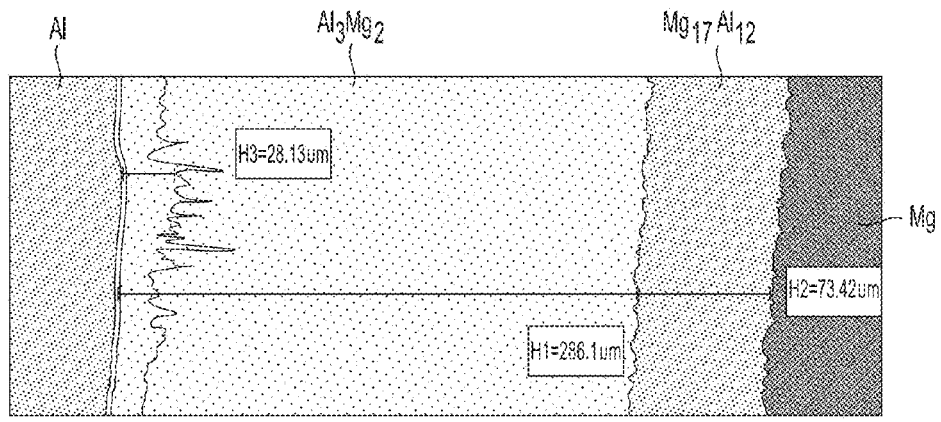
FIG. 5A is a black and white line drawing of a scanning electron microscope (SEM) image (i.e., a micrograph) depicting a portion of the magnesium layer and the aluminum layer of a multilayered spacer similar to that shown in FIG. 4, and the interlayer between the magnesium layer and the aluminum layer.
Figures 1, 5A:
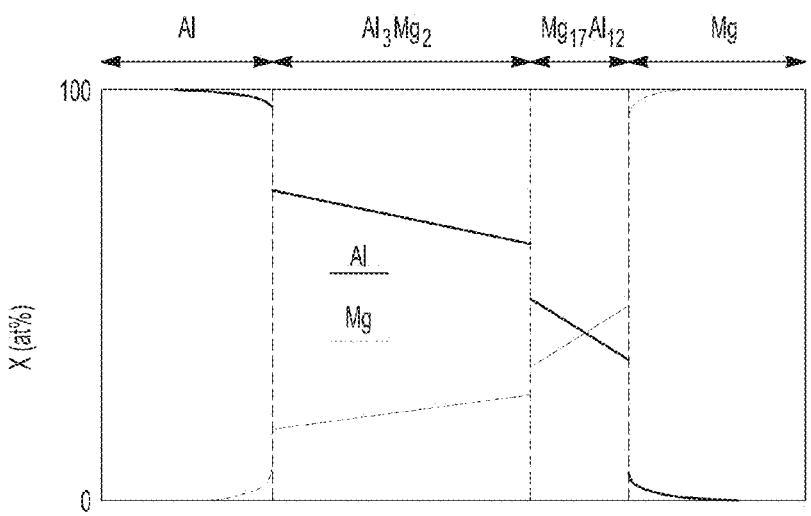

An example of the multilayered spacer 1020 is shown in FIG. 4. In this example, the first layer 1022 is formed from magnesium (e.g., AM50), and the second layer 1024 is formed from aluminum (e.g., AA6063). The interlayer 1028 formed during diffusion bonding of the layers 1022, 1024, in this example, includes portions containing magnesium and aluminum. A higher concentration of magnesium and a lower concentration of aluminum are present in one of the portions of the interlayer 1028 that is adjacent to the first layer 1022 compared to the other portion(s) of the interlayer 1028. Further, a higher concentration of aluminum and a lower concentration of magnesium are found in another of the portions of the interlayer 1028 that is adjacent to the second layer 1024 compared to the other portion(s) of the interlayer 1028. FIG. 5A is a micrograph showing a magnesium layer 1022, an aluminum layer 1024, and a magnesium-aluminum interlayer 1028 formed as a result of diffusion bonding. The interlayer 1028 includes a portion situated adjacent to the magnesium layer 1022 that consists of $Mg_{17}Al_{12}$ and another portion situated adjacent to the aluminum layer 1024 that consists of $Al_3Mg_2$.

The interlayer 1028 includes a plurality of individual portions having different concentrations of the materials of the first and second layers 1022, 1024. In an example, there is a gradual decrease in magnesium concentration and a gradual increase in aluminum concentration across the interlayer 1028 moving from the magnesium layer 1022 to the aluminum layer 1024. FIG. 5A-1 is a concentration profile of part of the multilayered spacer 1020 depicted in the micrograph shown in FIG. 5A. The X-axis represents the distance along the aluminum layer 1024, the interlayers 1028, and the magnesium layer 1022. This concentration profile shows that the aluminum concentration (where the concentration is represented as "X" in atomic percent (at %) along the Y-axis)) gradually decreases nearing the interface between the aluminum layer Al and the portion of the interlayer $Al_3Mg_2$. A distinct change in concentration (e.g., a step function) from the aluminum layer Al to the interlayer $Al_3Mg_2$ then occurs. There is then gradual decrease in aluminum concentration and a gradual increase in magnesium concentration while moving across the portion of the interlayer $Al_3Mg_2$, from the left hand side to the right hand side in FIG. 5A-1. Another step function occurs from the portion of the interlayer $Al_3Mg_2$ to the portion of the interlayer $Mg_{17}Al_{12}$. A gradual, yet steeper concentration gradient of a decreasing aluminum concentration and an increasing magnesium concentration occurs from left to right (in FIG. 5A-1) across the interlayer portion $Mg_{17}Al_{12}$. Further, moving from right to left across FIG. 5A-1, the magnesium concentration gradually decreases nearing the interface between the magnesium layer Mg and the portion of the interlayer $Al_{17}Mg_{12}$, and a step function occurs at the interface between the magnesium layer Mg and the interlayer portion $Al_{17}Mg_{12}$.

Figure 5B:
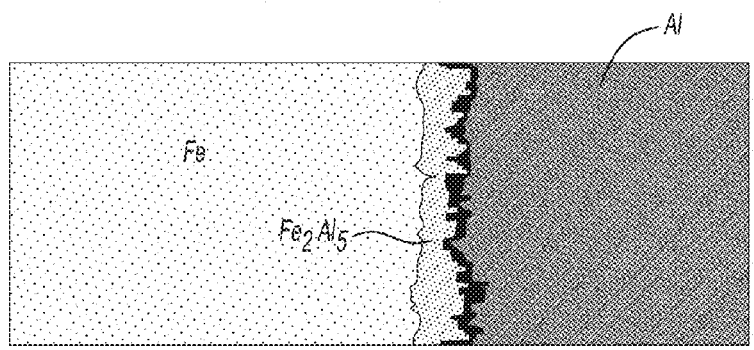
FIG. 5B is a black and white line drawing of a SEM image (i.e., a micrograph) depicting a portion of the aluminum layer and the steel layer of a multilayered spacer similar to that shown in FIG. 4, and the interlayer between the aluminum layer and the steel layer.

Referring back to FIG. 4, as previously mentioned, the second 1024 and third 1026 layers of the spacer 1020 are also bonded to one another by diffusion bonding. During diffusion bonding, the interlayer 1030 is formed between the layers 1024 and 1026. Diffusion bonding of these layers may be accomplished at a time and temperature that is suitable for diffusion bonding the first 1022 and second 1024 layers, or may be diffusion bonded in a separate step at a different time and temperature from that used for diffusion bonding the first 1022 and second 1024 layers. Further, in the example shown in FIG. 4, the second layer 1024 is formed from aluminum (as previously mentioned) and the third layer 1026 is formed from steel. The interlayer 1030 formed during diffusion bonding of the layers 1024, 1026, in this example, includes a portion(s) containing aluminum and iron (which is the primary element of steel). FIG. 5B is a micrograph showing an aluminum layer 1024, a steel layer 1026, and an aluminum-iron interlayer 1030. The interlayer 1030 includes a portion that consists of $Fe_2Al_5$. Within this interlayer 1030, there may be a gradient, where a higher concentration of iron is located near the interface between the steel layer 1026 and the interlayer 1030 and where a higher concentration of aluminum is located near the interface between the interlayer 1030 and the aluminum layer 1024.

In an example, the thickness of each of the layers 1022, 1024, 1026 of the multilayered spacer 1020 is about the same, and the thickness can be as thick as desired. For a structure including a magnesium engine cradle and a steel bolt, for example, each of the layers 1022, 1024, 1026 may have a thickness of about 2 mm. The entire thickness of the spacer 1020 in this example ranges from about 5 mm to about 6 mm. The thickness of the layers 1022, 1024, 1026, and thus the entire thickness of the spacer 1020, will depend, at least in part, on the components 1012, 1014 to be in contact with, or joined together. For instance, smaller components 1012, 1014 may use smaller spacers 1020, while larger components 1012, 1014 may use larger spacers 1020. Further, the diameter of the spacer 1020 may be as large as desired given the size of the components 1012, 1014 to be joined together. For a structure including a magnesium engine cradle and a steel bolt, for example, the diameter of the spacer 1020 should be about the same diameter of the head portion of the bolt. In this example, the diameter of the spacer 1020 ranges from about 2.5 mm to about 3 mm.

It is further believed that the extent of galvanic corrosion of the structure 1000 shown in FIG. 3 may depend, at least in part, on a cathode-to-anode area ratio. It may therefore be desirable for the thickness of the first layer 1022 to be larger than the respective thicknesses of the second layer 1024 and the third layer 1026. In this way, the area of the anode (e.g., first layer 1022 thickness) is larger than the area of the cathode (e.g., the second layer 1024 or third layer 1026 thickness), and thus the cathode-to-anode area ratio would be lower. The lower cathode-to-anode area ratio would then reduce galvanic corrosion within the spacer 1020, and then the spacer 1020 will have a longer usable life. In an example, the thickness of the first layer 1022 (i.e., the magnesium layer 1022) is about 4 mm, while the thicknesses of each of the second layer 1024 and the third layer 1026 is about 1 mm.

Further, the thickness of the interlayers 1028, 1030 will depend, at least in part, on processing conditions, including processing time and pressure, during diffusion bonding. In one example, diffusion bonding of the second layer 1024 to the third layer 1026 occurred at about 500° C. for about 2.5 hours, and the thickness of the entire interlayer 1030 was measured to be about 25 μm. Then, diffusion bonding of the first layer 1022 to the second layer 1024/third layer 1026 assembly occurred in a separate step at 390° C. for about 2 days, and the thickness of the entire interlayer 1028 was measured to be about 350 μm.

Figure 3A:
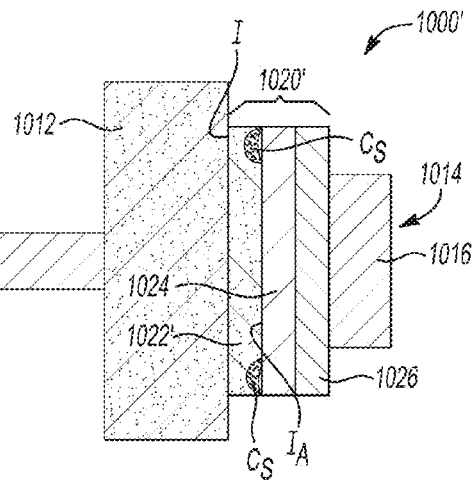
FIG. 3A schematically depicts the example of the structure depicted in FIG. 3 after the structure has been exposed to a corrosive environment.

Referring now to FIG. 3A, when the structure 1000 of FIG. 3 is exposed to a corrosive environment, galvanic corrosion will occur at an interface $I_A$ formed between the first layer 1022 (e.g., a magnesium layer) and the second layer 1024 (e.g., an aluminum layer) rather than at the interface I formed between the magnesium component 1012 and the spacer 1020. The structure 1000' depicted in FIG. 3A illustrates the galvanic corrosion in the layer 1022'. In this way, portion(s) of the magnesium layer $1022'$ of the spacer $1020'$ will corrode, as shown by reference character $C_S$ occurs, rather than the magnesium component 1012.

It is also believed that some galvanic corrosion of the aluminum layer 1024 may occur at the interface between the aluminum layer 1024 and the steel layer 1026, rather than, for example at the component 1016. This galvanic corrosion of the aluminum layer 1024 may occur due, at least in part, to the potential difference between the aluminum and the steel.

Another example structure 10000 is schematically depicted in FIG. 8. The structure 10000 includes the first component 1012 in contact with a second component 1032, and the fastener 1014 joining the components 1012, 1032 together. A multilayered spacer $1020_A$ is disposed between the first component 1012 and the head portion 1016 of the fastener 1014, and another multilayered spacer $1020_B$ is disposed between the first component 1012 and the second component 1032. In an example, the first component 1012 includes magnesium, the second component 1032 includes aluminum, and the fastener 1014 includes steel.

The multilayered spacer $1020_A$, in this example, includes a first layer $1022_A$ consisting of magnesium, a second layer $1024_A$ consisting of aluminum, and a third layer $1026_A$ consisting of steel. The spacer $1020_A$ is situated so that the first layer $1020_A$ is positioned adjacent to the magnesium component 1012 and the third layer $1026_A$ is positioned adjacent to the head portion 1016 of the steel fastener 1014. The other spacer $1020_E$ includes a first layer $1022_E$ consisting of magnesium, a second layer $1024_E$ consisting of zinc, and a third layer $1026_E$ consisting of aluminum. The spacer $1020_E$ is situated so that the first layer $1022_E$ is positioned adjacent to the magnesium component 1012 and the third layer $1026_E$ is positioned adjacent to the aluminum component 1032.

As shown in FIG. 8A, after being exposed to a corrosive environment, portion(s) of the magnesium layer $1022_A'$ of the spacer $1020_A'$ corrode (as designed by reference character $C_{S\text{-}A}$) and portion(s) of the magnesium layer $1022_B'$ of the spacer $1020_B'$ corrode (as designed by reference character $C_{S\text{-}B}$). In this example, galvanic corrosion does not occur on either side of the magnesium component 1012.

An example of making the examples of the structure 1000, 1000', 10000, 10000' described hereinabove will now be described herein. The method involves forming the multilayered spacer(s) 1020, 1020', $1020_A$, $1020_A'$, $1020_B$, $1020_B'$ by diffusion bonding the first layer 1022, 1022', $1022_A$, $1022_A'$, $1022_B$, $1022_B'$ to the second layer 1024, $1024_A$, $1024_B$, and diffusion bonding the second layer 1024, $1024_A$, $1024_E$ to the third layer 1026, $1026_A$, $1026_B$. Diffusion bonding is accomplished as previously described. After diffusion bonding is complete, the spacer 1020, 1020', $1020_A$, $1020_A'$, $1020_B$, $1020_B'$ is air cooled before assembling the structure 1000, 1000', 10000, 10000'.

In an example of forming the structure 1000, 1000', the spacer 1020, 1020', $1020_A$, $1020_A'$ is placed between the component 1012 (e.g., a magnesium component) and the component 1014 (e.g., the head portion 1016 of the fastener 1014). In this example, the spacer 1020, 1020', $1020_A$, $1020_A'$ may be shaped as a disc with an aperture in the center. The spacer 1020, 1020', $1020_A$, $1020_A'$ is positioned adjacent to a surface of the component 1012, where the first layer 1022, 1022', $1022_A$, $1022_A'$ is adjacent to the component 1012. The spacer 1020, 1020', $1020_A$, $1020_A'$ is also positioned so that the aperture of the spacer 1020, 1020', $1020_A$, $1020_A'$ aligns with an aperture defined in the component 1012. The components 1012 and 1014 are joined together by feeding the fastening portion 1018 of the fastener 1014 through the aperture of the spacer 1020, 1020', $1020_A$, $1020_A'$ and the aperture of the component 1012 so that the head portion 1016 abuts the third layer 1026, $1026_A$ of the spacer 1020, 1020', $1020_A$, $1020_A'$.

In an example of forming the structure 10000, 10000', the spacer $1020_B$, $1020_B'$ is placed between the component 1012 and the component 1032, where the first layer $1022_B$, $1022_B'$ abuts the component 1012 and the third layer $1026_B$ abuts the component 1032. In this example, the components 1012, 1032 may each have an aperture defined therein, and configured to receive the fastening portion 1018 of the fastener 1014. Then, the spacer 1020, 1020', $1020_A$, $1020_A'$ is positioned adjacent to the component 1012 such that the first layer 1022, 1022', $1022_A$, $1022_A'$ is positioned adjacent to the component 1012. Then the fastening portion 1018 of the fastener 1014 is fed through the apertures defined in the spacer 1020, 1020', $1020_A$, $1020_A'$, the component 1012, the spacer $1020_B$, $1020_B'$, and the component 1032 to join the components 1012, 1014, 1032 together.

In other examples, the component 1014 may not be a fastener that extends through a portion of the component 1012, but rather is a hub that is completely separated from a wheel via the spacer 1020, 1020', $1020_A$, $1020_A'$ disclosed herein or is a steel hinge that is completely separated from a door inner via the spacer 1020, 1020', $1020_A$, $1020_A'$ disclosed herein.

To further illustrate the present disclosure, an example is given herein. It is to be understood that this example is provided for illustrative purposes and is not to be construed as limiting the scope of the disclosed example(s).

EXAMPLE

Three structures were formed. Structure A was formed by joining a component consisting of AM50 magnesium alloy and a bolt made from mild steel with the composition of 0.05 wt % carbon, 0.2 wt % manganese, 0.05 wt % silicon, 0.02 wt % sulfur, 0.01 wt % phosphorus, and the balance iron. No spacer was used in Structure A, and thus structure A was a comparative example. Structure B was formed by disposing a 2.5 mm thick spacer, formed of AA6063 aluminum alloy, between a head portion of a bolt formed from mild steel and an AM50 magnesium alloy component. Structure B was also a comparative example. Structure C was formed by disposing a 2.4 mm thick multilayered spacer (as disclosed herein) between a head portion of a bolt formed from mild steel and an AM50 magnesium alloy component. The multilayered spacer included an AM50 magnesium alloy layer diffusion bonded to an AA6063 aluminum alloy layer, which was diffusion bonded to a mild steel layer.

Figure 9B:
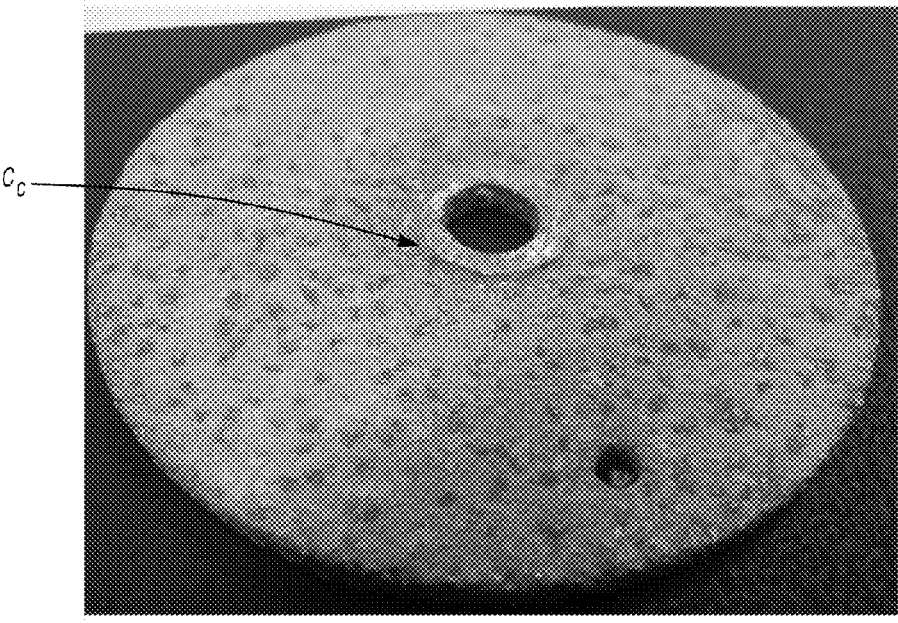
Figure 9C:
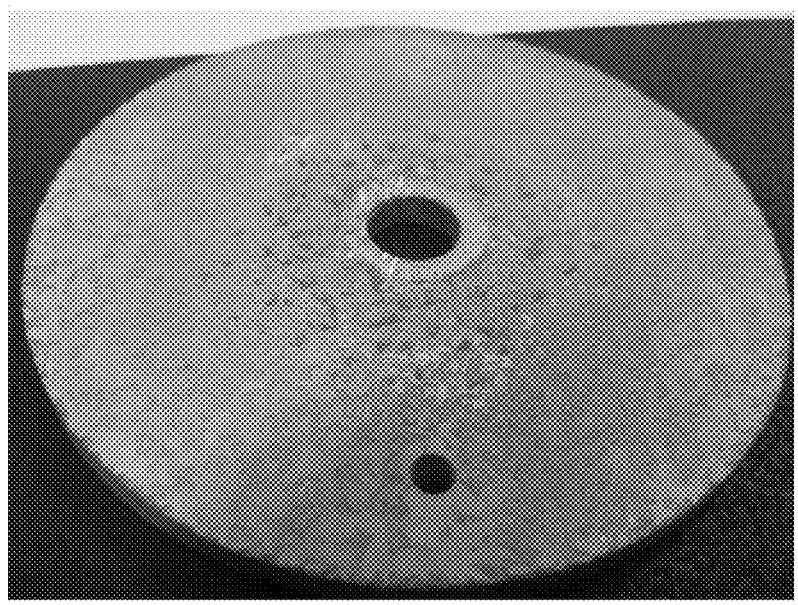
Figure 10A:
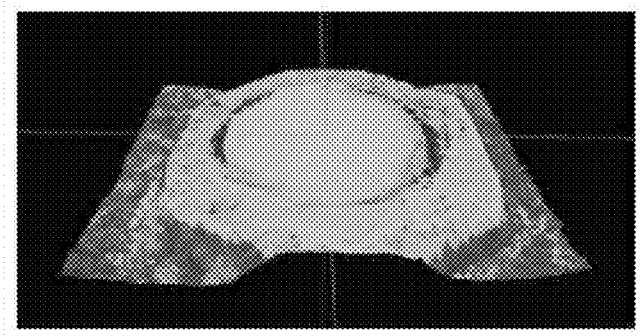
FIGS. 10A, 10B, and 10C are depth profiles of a portion of the structures shown in FIGS. 9A, 9B, and 9C, respectively, including the interface between the magnesium component and the steel fastener.
Figure 10B:
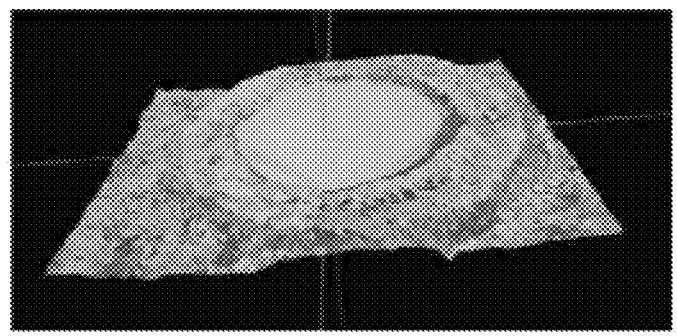
Figure 10C:
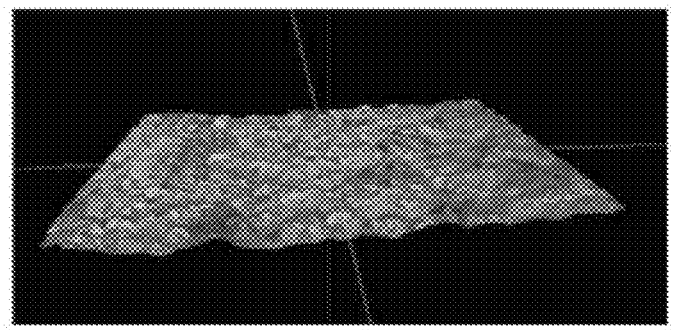

Structures A, B, and C were then immersed in a corrosive environment of a 1.6 wt % NaCl solution for about 1 day, and photographs of a top view of each of the structures A, B, and C were taken. These photographs are shown in FIGS. 9A, 9B, and 9C, respectively. Depth profiles of each of the Structures A, B, and C were also obtained from a stereo optical microscope manufactured by Leica Microsystems. As shown from the photographs in FIGS. 9A and 9B, as well as the corresponding depth profiles in FIGS. 10A and 10B, it is visibly noticeable that galvanic corrosion (labeled $C_C$ in FIGS. 9A and 9B) at an interface between the magnesium component and the head portion of the steel bolt was reduced by use of the aluminum spacer in the Structure B compared to Structure A which had no spacer. No galvanic corrosion of the magnesium component of Structure C at the interface between the magnesium component and the head portion of the steel bolt can be seen in FIGS. 9C and 10C. This is evident by the flat top surface of the Structure C shown in FIG. 9C, as well as the flat depth profile shown in FIG. 10C. However, some general corrosion of the magnesium component was found across the surface of the component.

The maximum galvanic corrosion rate in millimeters per year (mm/y) was also measured for each of the Structures A, B, and C using the stereo optical microscope by measuring the maximum depth at the interface in mm for 1 day of exposure. The maximum galvanic corrosion rate in mm/yr may be calculated from this measurement. The corrosion rate for Structure A that included no spacer was measured to be about 315 mm/y, while the galvanic corrosion rate for Structure B that included an aluminum spacer was measured to be about 237 mm/y. It was found that the galvanic corrosion rate for Structure C that included the multilayered spacer was significantly smaller than for either of Structures A or B. The galvanic corrosion rate of the Structure C was measured to be about 74 mm/y.

It is to be understood that the ranges provided herein include the stated range and any value or sub-range within the stated range. For example, a temperature ranging from about 380° C. to less than 437° C. should be interpreted to include not only the explicitly recited limits of about 380° C. to less than 437° C., but also to include individual values, such as 390° C., 415° C., etc., and sub-ranges, such as from about 395° C. to about 420° C., from about 400° C. to about 405° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting

The invention claimed is:

1. A structure, comprising:
   a first component including a first material;
   a second component joined to the first component, the second component including a second material that is dissimilar from the first material; and
   a spacer disposed between the first component and the second component, the spacer to eliminate galvanic corrosion of the first component at an interface between the first component and the second component, and the spacer comprising:
   a first layer consisting of the first material;
   a second layer bonded to the first layer, the second layer consisting of a third material, the third material being different from the first material and different from the second material; and
   a third layer bonded to the second layer, the third layer consisting of the second material.

2. The structure as defined in claim 1 wherein: the second component has a head portion and a fastening portion; the fastening portion of the second component is in contact with the first component; and the spacer is disposed between the first component and the head portion of the second component.

3. The structure as defined in claim 1, further comprising:
   a fastener joining the first component and the second component, the fastener including a head portion and a fastening portion, and the fastener including a fourth material; and
   an other spacer disposed between the head portion of the fastener and one of the first component or the second component, the other spacer to mitigate galvanic corrosion between the fastener and the one of the first component or the second component, and the other spacer comprising:
   an other first layer consisting of the first material or the second material;
   an other second layer bonded to the other first layer, the other second layer consisting of the third material; and
   an other third layer bonded to the other second layer, the other third layer consisting of the fourth material.

4. The structure as defined in claim 1, wherein the third material is chosen from i) aluminum, an aluminum alloy, zinc, or a zinc alloy when the first material is magnesium or a magnesium alloy and the second material is steel, ii) zinc or a zinc alloy when the first material is magnesium or a magnesium alloy and the second material is aluminum or an aluminum alloy, and iii) iron, copper, tin, aluminum, an iron alloy, a copper alloy, an aluminum alloy, or a tin alloy when the first material is magnesium or a magnesium alloy and the second material is titanium or a titanium alloy.

5. The structure as defined in claim 1, further comprising a respective interlayer between the first and second layers, and between the second and third layers.

6. The structure as defined in claim 1 wherein the first material is magnesium or a magnesium alloy.

7. The structure as defined in claim 6 wherein the first layer is diffusion bonded to the second layer, and wherein an interlayer is formed between the first layer and the second layer, the interlayer including magnesium and aluminum.

8. The structure as defined in claim 1 wherein the second material is steel, aluminum, an aluminum alloy, titanium, or a titanium alloy.

9. The structure as defined in claim 8 wherein:
   the second material is steel;
   the second layer is diffusion bonded to the third layer; and
   an interlayer is formed between the second layer and the third layer, the interlayer including aluminum and iron.

10. The structure as defined in claim 1 wherein the first layer has a thickness that is larger than a thickness of the second layer and a thickness of the third layer.

11. A structure, comprising:
    a first component including a first material, wherein the first material is magnesium or a magnesium alloy;
    a second component joined to the first component, the second component including a second material that is dissimilar from the first material; and
    a spacer disposed between the first component and the second component, the spacer to eliminate galvanic corrosion of the first component at an interface between the first component and the second component, and the spacer comprising:
    a first layer consisting of the first material;
    a second layer bonded to the first layer, the second layer consisting of a third material, the third material being different from the first material and different from the second material;
    an interlayer between the first and second layers, wherein the interlayer includes a plurality of portions, one of the plurality of portions being situated adjacent to the first layer and having a higher concentration of magnesium and a lower concentration of aluminum than an other of the plurality of the portions that is situated adjacent to the second layer and
    a third layer bonded to the second layer, the third layer consisting of the second material.

12. The structure as defined in claim 11 wherein the one of the plurality of portions situated adjacent to the first layer is $Mg_{17}Al_{12}$, and where the other of the plurality of portions situated adjacent to the second layer is $Al_3Mg_2$.

* * * * *